(12) United States Patent
Thomasson

(10) Patent No.: US 6,620,443 B1
(45) Date of Patent: Sep. 16, 2003

(54) EDIBLE COLOR AND FLAVOR CARRIER AND METHOD FOR MAKING AN EDIBLE COLOR AND FLAVOR CARRIER

(75) Inventor: James L. Thomasson, Gardener, KS (US)

(73) Assignee: Cereal Ingredients, Inc., Kansas City, MO (US)

( * ) Notice: Subject to any disclaimer, the term of this patent is extended or adjusted under 35 U.S.C. 154(b) by 362 days.

(21) Appl. No.: 09/602,332

(22) Filed: Jun. 23, 2000

Related U.S. Application Data

(63) Continuation-in-part of application No. 09/345,023, filed on Jul. 2, 1999, now abandoned.

(51) Int. Cl.⁷ .............................. A23L 1/226; A23L 1/27
(52) U.S. Cl. .................. 426/96; 426/103; 426/250; 426/275; 426/650; 426/534; 426/658; 426/661; 426/458
(58) Field of Search .................... 426/94, 96, 103, 426/250, 275, 650, 534, 658, 661, 458, 803

(56) References Cited

U.S. PATENT DOCUMENTS

| | | | |
|---|---|---|---|
| 2,012,708 A | 8/1935 | Bostrom et al. ............... 99/10 |
| 2,428,665 A | 10/1947 | Harrel et al. .................. 99/83 |
| 3,111,411 A | 11/1963 | Livingston .................... 99/148 |
| 3,511,667 A | 5/1970 | Schramm et al. ............. 99/78 |
| 3,544,334 A | 12/1970 | Kozlik ........................... 99/92 |
| 3,582,353 A | 6/1971 | Fehr, Jr. et al. ................. 99/86 |
| 3,603,270 A | 9/1971 | Tangel ........................ 107/1 R |
| 3,671,264 A | 6/1972 | Drews et al. .................. 99/94 |
| 3,794,741 A | 2/1974 | Weigle ........................ 426/156 |
| 3,920,854 A | 11/1975 | Wuhrmann et al. ......... 426/250 |
| 3,922,354 A | 11/1975 | Galluzzi et al. .............. 426/96 |
| 4,112,125 A | 9/1978 | Chesnut et al. ............. 426/250 |
| 4,451,488 A | 5/1984 | Cook et al. .................... 426/89 |
| 4,710,386 A | 12/1987 | Fulger et al. ................. 426/28 |
| 4,732,775 A | 3/1988 | Millauer ..................... 426/635 |
| 4,789,664 A | 12/1988 | Seligson et al. .............. 514/23 |
| 4,790,996 A | 12/1988 | Roush et al. ................ 426/458 |
| 4,828,846 A | 5/1989 | Rasco et al. .................. 426/18 |
| 5,061,497 A | 10/1991 | Thacker et al. ............... 426/31 |
| 5,082,673 A | 1/1992 | Inglett .......................... 426/21 |
| 5,084,296 A | 1/1992 | Lugay et al. ................ 426/573 |
| 5,106,634 A | 4/1992 | Thacker et al. ............... 426/31 |
| 5,120,559 A | 6/1992 | Rizvi et al. ................. 426/446 |
| 5,133,984 A | 7/1992 | Murphy ...................... 426/496 |
| 5,190,786 A * | 3/1993 | Anderson et al. ........... 426/631 |
| 5,206,355 A | 4/1993 | Richards et al. ............. 536/4.1 |
| 5,250,308 A | 10/1993 | Alexander et al. ............ 426/94 |
| 5,332,585 A | 7/1994 | Odermatt et al. ............. 426/96 |
| 5,344,664 A * | 9/1994 | Fitch et al. .................. 426/631 |
| 5,395,623 A | 3/1995 | Kovach ........................ 426/28 |
| 5,403,610 A | 4/1995 | Murphy et al. ............. 426/549 |
| 5,417,992 A | 5/1995 | Rizvi et al. ................. 426/283 |
| 5,456,933 A | 10/1995 | Lee ............................. 426/549 |
| 5,482,560 A * | 1/1996 | Ammeraal et al. ........... 127/40 |
| 5,554,402 A | 9/1996 | Smith et al. ................. 426/549 |
| 5,603,975 A * | 2/1997 | Fontana ...................... 426/506 |
| 5,718,931 A | 2/1998 | Walter et al. ............... 426/102 |
| 5,888,564 A | 3/1999 | Fontana ....................... 426/94 |
| 6,110,511 A * | 8/2000 | Rollins et al. ................ 426/94 |
| 6,187,351 B1 * | 2/2001 | Porzio et al. ................. 426/96 |
| 6,316,039 B1 * | 11/2001 | Heyland ..................... 426/533 |

OTHER PUBLICATIONS

Harper, J.M., et al., *Extrusion Cooking*, Mercier, C., et al., (eds.), American Association of Cereal Chemists, Inc., St. Paul, MN, pp. 2, 9–11, (1989).

Baikow, V.E., In: *Manufacture and Refining of Raw Cane Sugar—Second, Completely Revised Edition*, Glossary Definition of "Amorphous Sugar", Elsevier Scientific Publishing Company, New York, p. 555, (1982).

\* cited by examiner

*Primary Examiner*—Nina Bhat
(74) *Attorney, Agent, or Firm*—Schwegman, Lundberg, Woessner & Kluth, P.A.

(57) ABSTRACT

The present invention comprises a method for making a flavor and color carrier that forms a smearable particle. The method comprises preparing a mixture of sugar and an edible particulate selected from a group consisting of corn cereal or corn flakes, rolled oats, rice, rice particles, high fiber, high protein starch bearing cereal grain, and potato particles. The method also includes extruding the mixture without crystallizing the sugar and cutting the extruded mixture to form flavor and color carriers.

21 Claims, No Drawings

EDIBLE COLOR AND FLAVOR CARRIER AND METHOD FOR MAKING AN EDIBLE COLOR AND FLAVOR CARRIER

The present application is a Continuation-In-Part of U.S. application Ser. No. 09/345,023, filed Jul. 2, 1999, now abandoned.

FIELD OF THE INVENTION

The present invention relates to an extruded flavor and color carrier particle which is edible and to a method for making the edible flavor and color carrier.

BACKGROUND OF THE INVENTION

Particulate food products, having use as food analogs such as fruit analogs, have been made and used for several decades. One type of particulate food analog is prepared from a sugar-based formulation and is boiled as a candy. The formulation includes an elevated concentration of sucrose, flour, grits, a fat such as vegetable oil, coloring and flavoring. The step of boiling this food analog crystallizes the sugar, thereby rendering the food analog rigid. Further processing of this food analog, such as breaking the product into pieces generates significant fines which impacts the overall efficiency of this particular type of process.

When this type of food particulate is added to a dough or batter and then baked, the food particulate analog cannot withstand extended mixing of the batter or baking of the dough or batter. What occurs during mixing and baking is that a significant portion of the particulate disintegrates and "bleeds out" color that may have been added to the particulate. This feature of the particulate food analog is undesirable because the excessive "bleeding out" does not simulate the performance of the fresh or dehydrated food article. It is the fines that produces the "bleeding out." The fines then substantially instantly dissolve upon mixing with dough or batter. Larger particles do not dissolve at this stage.

The larger particles do not retain their integrity during a baking or cooking process. The large particles dissolve, producing large holes in the end product. As a consequence, the final product is also undesirable.

These features are inconsistent with features of the food being simulated. One other problem with sugar-based particulate food analogs is that the analogs do not lend themselves to a uniform particle size when produced in bulk because the particles fracture. Specifically, it has not been possible to produce a particle of a preselected size without also producing a high percentage of fines. In addition to fines, manufacture has produced a wide, unacceptable variance of sizes in types of the product.

In one other production method, a food analog particulate is produced with a high fat content. The food is not generally regarded as wholly satisfactory because, typically, a high fat food is not preferred by consumers. The high fat food analog is made by pressing a high fat mixture through a sieve to make an individual particulate product. Size uniformity of the particulate product is better achieved through this type of pressing process. However, the particulate food pieces are high in fat and caloric content and do not maintain their integrity when they are added to a batter or dough, are mixed and then are cooked or baked. Because the food analog particles have a high fat content, the particles do not withstand ambient temperatures during storage. As a consequence, these food particles require special storage, such as refrigeration which is expensive and is not always available.

Moreover, the high fat particles do not carry added flavors or colors very well. Due to the high fat content of the particles, the particles do not retain their discrete particle integrity when added to a dough or batter because of the thermal conditions required to bake the dough or batter. These high temperature conditions may occur during processes such as molding and proofing. As a consequence, a finished baked good that contains the high fat particulates is comprised of color stains and holes where the high fat piece once existed but melted from the thermal conditions.

SUMMARY OF THE INVENTION

One embodiment of the present invention includes an edible carrier for color or for flavor or for color and flavor. The edible carrier includes ingredients which have been tempered by cold extrusion that comprise a sugar such as sucrose in a concentration of at least about 30% by weight, a bulking agent such as flour, a particulate material such as corn cereal, corn flakes, corn grits, rolled oats, rice flakes or potatoes, or a fiber like HK-15 wheat fiber concentrate manufactured by Cereal Ingredients of Kansas City, Mo., or a mixture of the particulates and a color and/or flavoring agent. The edible carrier forms a small gummy spot when baked an end- product application. The edible carrier has a soft bite.

One other embodiment of the present invention includes a method for making an edible flavor and color particulate carrier. The method includes preparing a mixture of sugar such as sucrose in a concentration of at least about 30 to 65% by weight, flour in a concentration of about 10 to 50% by weight, a particulate such as corn flakes, corn cereal, rolled oats, rice flakes or potatoes or a mixture of the particulates in a concentration of about 10 to 30% by weight, and flavoring and color in addition to a vegetable oil in a concentration of about 0 to 5% by weight. The mixture is extruded without an addition of exogenous heat in order to form a particle. The temperature of extrusion is well below a crystallization point of the sugar which is about 240° F.

DETAILED DESCRIPTION

The method of the present invention for making an edible flavor and color particle carrier includes preparing a mixture of ingredients that includes a sugar such as sucrose in a concentration of at least about 30to 65% by weight, a bulking agent such as flour in a concentration of 30% by weight, a particulate such as corn cereal, corn flakes, corn grits, rolled oats, rice flour or potatoes or a mixture of these particulates in a concentration of about 20% by weight, vegetable oil in a concentration of about 3% by weight and color and flavor as required. The mixture is extruded without any source of exogenous heat. Extruded material is passed through a die at the outlet of the extruder and is cut to form particles. The particles are dried.

The present invention also includes an extruded particle that comprises a sugar such as sucrose in a concentration of at least 30to 65% by weight, a bulking agent such as flour, a particulate such as corn cereal, corn flakes, corn grits, rolled oats, rice flour, or potatoes, or a mixture of the particulates and a dye and/or a flavoring material.

In one embodiment, the cereal grain comprises a high fiber, high protein starch bearing cereal grain, such as HK-15, manufactured by Cereal Ingredients of Kansas City, Mo. The cereal grain is prepared with 60% to 80% by weight of the starch converted to a soluble form and 4% to 30% of the weight converted to a caramel sugar mixture with 70% maltose and less than 5% glucose. The cereal grain is, for some embodiments, wheat grain that is enzymatically converted to a soluble form. Other acceptable grains include rice, oats, corn, barley, sorghum, rye and combinations of these grains. One cereal grain preparation suitable for use in the present invention is HK-15, which is described in the Kovach patent, U.S. Pat. No. 5,395,623, that issued on Mar. 7, 1995. This patent is herein incorporated by reference.

In one embodiment, the cereal grain described in the Kovach patent had a total dietary fiber of about 33% by weight and a protein concentration of about 27% dry weight. This cereal grain may be obtained in a process of producing alcohol from grain. This embodiment imparts a product with a caramel flavor.

In one other embodiment, the high protein, high fiber cereal grain is also obtained in a process of producing alcohol from grain. In this embodiment, the cereal grain has an enzymatic starch conversion of 90% to 100%. Suitable cereal grains include wheat, corn oats, rice, barley, sorghum, rye and combinations of these grains. The grains have a protein content range of 17% to 30%, on a dry matter basis. The grains have a total dietary fiber content on a dry matter basis of between 30% and 70% by weight and a nitrogen free extract content on a dry weight basis of less than 40%. The particles have a coating of residual sugars from the enzymatic conversion of starch which is 17% to 30% by weight on a dry weight matter basis.

When the edible coloring or flavoring particle is added to a dough or batter, in some embodiments, the particle, when baked, forms a small gummy, smeared spot in the end product application.

In one embodiment, the color and flavor carrier comprises corn cereal or corn flakes in a concentration of 17 to 75%, wheat flour in a concentration of 19 to 85%, and sucrose in a concentration of 50 to 65%. In one specific embodiment, flour has a concentration of 37.6% by weight of the mixture. Sucrose concentration is 57% by weight of the mixture. Oil concentration is 3 to 6% by weight. The remainder is corn cereal or corn flakes.

For some embodiments, these ingredients are thoroughly mixed and hydrated prior to extrusion in a device such as a forming/processing extruder. For other embodiments, such as twin screw extrusion, hydration occurs as a part of the extrusion process. Mixing occurs for about 10 to 15 minutes, until the ingredients are thoroughly incorporated. Following mixing, the hydrated mixture is extruded through a forming/processing extruder. The forming/processing extruder comprises a barrel that is cooled with chilling water at a temperature of about 50 degrees Fahrenheit. The temperature of the extrudate is about 90 to 110 degrees Fahrenheit. This compares to an extrudate temperature of about 110 to 180 degrees Fahrenheit for conventional extrusion.

A use of corn cereal or corn flakes imparts a desirable durability to the particles. The corn cereal or corn flakes also imparts a desirable flavor to the particles.

The method of the present invention fabricates a high sugar, color and flavor carrier that makes a gummy spot in a baked dough or batter matrix without a significant generation of fines by a method very different from what is conventionally utilized. A conventional method of making this type of product includes a step of heating sugar in water so that the temperature of the sugar/water mixture is well above the crystallization point of sugar of about 250°. The method of the present invention does not include a water component and does not heat a mixture above the crystallization point of sugar to make the soft, shiny flavor and color carrier.

In a conventional particle manufacturing process, when other ingredients are added to the sugar, such as a bulking agent and a particulate material such as corn cereal, and corn flakes to make a final product, the final product has a glassy appearance and is quite hard and brittle, like a candy, when sugar concentration is above about 55% by weight. When this particle is broken, significant fines are generated. Up to about 40% of the total weight of the product comprises fines. The fines cannot be reworked to make additional product because of the physical and chemical changes which occurred during the initial heating process of the sugar and water mixture.

These fines are not generated in the process of the present invention. Furthermore, unlike other extruded particles, the particle of the present invention has an unexpectedly soft bite and mouthfeel in the final application, despite its shiny appearance. Because of the high sugar concentration and appearance of the particle, one would expect the particle of the present invention to be hard like a candy, rather than soft. Furthermore, one would expect the particle to be brittle. However, the particle which is extruded, is not brittle and does not generate significant fines during formation. It is believed that the particles added to the mixture, such as the corn flakes, corn cereal, corn grits, rolled oats, rice flakes or potatoes, provide sites for sucrose or other sugar coating. Thus, the sucrose or other sugar coats these particles without actually crystallizing. Consequently, the overall edible flavor of the particle remains soft. Furthermore, because fines generation is controlled, color dispersion is controlled.

In one embodiment, the ingredients are extruded in a twin screw type extruder. Ingredients may also be extruded in a forming/processing extruder. The dry ingredients are blended with enough oil so as to have the oil provide a lubricant of the dry ingredients through the extruder. A single screw extruder will also successfully produce particles of the present invention. Extrusion is performed without any source of exogenous heat. That is, the particles are made with no addition of heat other than heat generated by friction within the extruder. As a consequence, any temperature to which the mixture is exposed is low.

Because there are substantially no fines generated by the process of the present invention, there is no need to have a sophisticated screening process after the extrusion process as is the case for conventional color and flavor particle manufacture. As a consequence, the process of the present invention has an improved efficiency overall.

What fines are generated by the process of the present invention may be reworked in a subsequent extrusion because the sugar component is not crystallized. Therefore, the process of the present invention has substantially no waste products.

While coloring and flavoring may be added to the mixture prior to extrusion, it is also contemplated that flavoring may be added to extruded particles. In one flavor-adding embodiment, a liquid with flavoring is sprayed onto extruded particles. In another embodiment, the flavoring agent is in a solid or powder form and is applied by sifting onto extruded particles or by immersing the extruded particles into the powder.

The moisture of the finished products is typically less than 10% by weight. When embedded into a baked end product, the baked particle has a glassy and brittle appearance although the actual mouthfeel is soft. The appearance is bright and shiny. The texture is, however, soft and not hard.

In one embodiment, the mixture is conveyed by a screw through a screw-type extruder without an addition of an external source of heat. The hydrated mixture which is referred to herein as an "extrudate" has a dough-like consistency. Any temperature increase of the mixture is due to shear generated by the extruder. The outlet temperature typically ranges from about 80° F. to 110° F. For some embodiments, the outlet temperature may be as high as 180° F. Temperature rise of the mixture within the extruder is reduced by the fat ingredient which acts to "grease" the mixture through the extruder, thereby reducing shear and heat evolution. Typically, the fat concentration ranges from about 0 to 8% by weight for embodiments, the outlet temperature may be as high as 180° F. Temperature rise of the mixture within the extruder is reduced by the fat ingredient which acts to "grease" the mixture through the extruder, thereby reducing shear and heat evolution. Typically, the fat concentration ranges from about 0 to 8% by weight for standard products; however, for streusel-type products fat content can be as high as 30%. Fat concentration ranges from about 1 to 4% by weight of the mixture. Fat, such as oil, is added primarily for lubricity during extrusion. Fat, such as oil, may also be added in order to create a desired mouthfeel for some product embodiments.

The term "flavor" or "flavoring" as used herein refers to an organoleptic agent in a form of an emulsion, concentrate, aqueous- or oil-soluble liquid or a dry powder which may be added to the mixture either prior to extrusion, by extrusion, or after extrusion. Flavorings include any fruit flavors such as berry flavors, apple, cherry, plum, raisin, banana, pear, peach, figs, dates, lemon, coconut and so on. Flavorings may also include any nut flavors as well as any sweet flavors such as chocolate, vanilla, caramel, butterscotch, cinnamon, graham flavors, mint and so on. Flavorings additionally include any savory flavors such as all meat, game, fowl, fish, dairy, barbecue, smoke, pepper, and vegetable flavors. Flavorings also include any cheese flavors such as Parmesan and cheddar. The term "color" or "coloring agent" as used herein refers to natural or uncertified colors from natural sources or certified colors for the effect of color. In one embodiment, the colors include dyes, certified aluminum lakes or colors derived from a natural source. Coloring agents may also be water-based or oil-based or dry. Coloring agents may be primary colors, blends of colors or discrete mixtures of colors, such as confetti.

The term "nutraceutical" as used herein refers to edible materials having, or believed to have, medicinal effects. Nutraceuticals include the tocopherols, B vitamins, ginseng, wheat grass and barley grass and extracts of the grasses, soy-based estrogen analogs, black cohosh, minerals and so on. The method and product of the present invention are well suited to producing a carrier for materials such as nutraceuticals, that degrade when exposed to elevated temperatures.

The term "edible particulate" as used herein refers to edible flakes, grits and meal of corn, oats, rice, potatoes and other tubers, psyllium, wheat, soy, and fiber such as HK-15 and combinations of these materials.

The term "sugar" as used herein refers to substantially all sugars and sugar substitutes, including any monosaccharide such as glucose or fructose, disaccharides such as sucrose, dextrose, or maltose, polysaccharides such as starch, oligosaccharide, sugar alcohols, or other carbohydrate forms such as gums that are starch based, vegetable based or seaweed based.

The term "rework" or "reworked product" as used herein refers to extruded product of the present invention that is extruded again, in ground or regular form, as necessary, with an addition of oil or fat, a bulking agent such as flour, water and a coloring or flavoring agent to make another extruded product. Materials such as start-up waste, overs and unders, leftover material and agglomerated byproducts of the drying step are rework ingredients.

The term "fat" as used herein refers to any vegetable fat in solid or liquid form or fat substitute.

Upon exiting the extruder, the extrudate is passed through a die, is cut and is dried. The dried extrudate particles may be subjected to grinding or segregation as required for a final product specification. The temperature of the mixed, dough-like extrudate, within the extruder, remains below the crystallization point of the sugar. In one embodiment, colors or colors and flavors are added to the dough-like extrudate prior to entrance to the extruder.

The particles of the present invention may be made with "reworked" extruded product to make a new extruded product. The re-extrusion is possible because of the very small temperature increase generated as a consequence of extrusion. The low temperature does not produce a significant physical change.

To use the reworked extruded product, the extruded particles are ground to a consistency within a range of size of flour particles and particles are sometimes ground and/or added to the premix. The premix with the ground extruded product is introduced into the extruder and is then extruded to form a new extruded product. Colorings or colorings and flavorings are added to the premix or to the extruded product.

Particles of the present invention display either no bleed or a controlled bleed. Degrees of cold bleed are obtained by the high concentration of sucrose or other sugar as compared to other ingredients. The controlled bleed may also be adjusted by adjusting the concentration of dyes and dyes in combination with aluminum lakes in the premix.

In one embodiment, the particles are made by extrusion of a premix through a pitched screw configuration extruder. In particular, the screw has a pitch of about 80° at the inlet of the extruder and a decreasingly angled pitch approaching the die. The sugar, oil or other fat and flour, and grits or other edible particulates are blended and conveyed through the extruder. The fat component concentration is low because fat serves a function of reducing friction of the dough-like mixture in the extruder so that the mixture can be extruded without generating a substantial shear.

The screw is enclosed by jacketed barrels. The barrels define channels that in one embodiment have a spiral pitch. A use of the horizontal markings on the barrel tends to increase shear of the extrudate. In another embodiment, fluted liners inside the extruder barrel tend to increase shear of the extruded product. For some particle embodiments, the jacketed barrels are cooled by running water at a temperature of about 50 degrees Fahrenheit through the barrels, thereby indirectly cooling the extruded product. In another embodiment, the jacketed barrels have no water running through them, producing an extruded product at an ambient temperature.

Once the extruded product is extruded, cut and dried to produce a particulate product, the product is homogeneous in nature. As the extruded product exits the extruder, the extruded product is pressed through a die plate. The die plate is at one end of the pitched screw. The die plate may be configured to define holes of variable diameter, depth, and symmetry. The die plate may be fashioned with one or more holes by which the extruded product exits. The exit holes may be engineered to a variety of diameters and shapes. In one embodiment, the exit holes are uniform concentric circles having a diameter of about 4.75 millimeters.

Other embodiments include one or more concentric circles defined by the die ranging from 1.25 millimeters to 10 millimeters in diameter and the extrudate can be cut into lengths ranging from a fraction of a millimeter to 10 millimeters in length. In one embodiment, the exit holes are shaped like figures such as dinosaurs so that the extrudate takes on the shape of a dinosaur. Other shapes are possible, including geometric shapes, human and animal shapes, plant shapes and letters of the alphabet in a variety of sizes.

While the shape and diameter of the extrudate is determined by the shape and the size of the exit hole of the die plate, the length of the extrudate material is determined by a rotating knife or knives that are either internal or external to the die at the end of the die plate. As the extrudate exits the die plate, it is the diameter and shape that is determined by the die plate, a variable-speed knife or knives cut a specified length. The knife speed is determined by a rate at which the extrudate exits the die plate and by the length-specific embodiment desired.

In one embodiment, the extrudate passes through a concentric, circle-based die plate and knives that have a slight drag on the extrudate, thereby create an oval shape of approximately one millimeter in length. In another embodiment, the extrudate takes a shape of a concentric circle or circles ranging from 1.25 millimeters to 10 millimeters. The extrudate is cut at a range of one millimeter up to ten millimeters or more, depending upon the desired application. The extrudate exits the extruder with a moisture content of about 5 to 18% by weight.

After it is cut, the extrudate is transferred to a dryer to be dried to a desired moisture of between about 4 to 15%. In one embodiment, the dryer is a fluidized stainless steel bed that the extrudate transfers through by way of vibration until the extrudate is at a desired moisture. In another embodiment, the dryer is a single- or multi-stage dryer with perforated or non-perforated beds. Each stage in the dryer may be set to different temperatures in order to temper the product properly and to maintain discrete particles.

Although most sizes are achieved through the process of extrusion, it is possible to achieve the desired particle size by extruding a particle of 2 to 20 millimeters and then grinding, cutting, or otherwise fractionating this particle down to other sizes, thereby creating a variety of sizes and lengths. Particles may also be screened and segregated to a discrete and uniform particle size. Fines generated by this process may be re-worked.

In one embodiment, particles are sized to meet a very narrow size specification. The particles are sized with a grinder that generates few fines.

The extruded product of the present invention offers an ease of storage handling and exceptional product shelf life. The product of the present invention may be stored for up to a year-and-one-half at ambient temperature and under normal storage conditions. Thus, the extruded product of the present invention has superior shelf life when compared to the actual food being simulated.

It is to be appreciated that the method and product of the present invention have been described in particular detail with respect to preferred processes and formulations. The present invention, however, is not intended to be limited to these preferred embodiments. One skilled in the art will readily recognize that the actual method and product may be adjusted to accommodate particular conditions.

What is claimed is:

1. A method for making a flavor carrier or a color carrier that forms a smearable particle having a glassy and brittle appearance, comprising:

preparing a mixture of sugar, oil, and an edible particulate selected from a group consisting of meal, and flakes effective for imparting durability and flavor to the flavor carrier or color carrier comprised of corn, oats, rice, rice particles, high fiber, high protein starch bearing cereal grain, and tuber particles and mixtures of the particles to form a mixture having a gel-like consistency;

extruding the mixture without an addition of heat; and cutting the extruded mixture to form a flavor carrier or a color carrier.

2. The method of claim 1 and further comprising adding a flavor ingredient to the mixture.

3. The method of claim 1 and further comprising adding a color imparting ingredient.

4. The method of claim 1 and further comprising spraying the carriers with a flavor imparting ingredient.

5. The method of claim 1 and further comprising coating the carriers with a flavor imparting ingredient.

6. The method of claim 1 and further comprising adding an oil to the mixture prior to cutting.

7. The method of claim 1 and further comprising coating the carriers with a color imparting material.

8. The method of claim 1 wherein the carriers are extruded to form an extrudate at a temperature of not more than about 110 degrees Fahrenheit.

9. The method of claim 1 wherein the carriers are extruded in a single screw extruder.

10. The method of claim 1 wherein the mixture is extruded without an application of heat.

11. The method of claim 1 wherein the high protein, starch bearing cereal grain comprising a caramel sugar mixture with 70% maltose and less than 5% glucose.

12. A product made by the method of claim 1.

13. An edible flavor carrier having a glassy and brittle appearance, comprising: a sugar which has not re-crystallized, oil and a particulate selected from the group consisting of meal and flakes effective for imparting durability and flavor to the edible flavor carrier, made of a material selected from a group comprising corn, rice, tubers, and oats, high fiber, high protein starch bearing cereal grain, and mixtures of these particulates, wherein the carrier forms a smear when cooked in a batter or a dough.

14. The carrier of claim 13 and further comprising a flavor.

15. The carrier of claim 14 wherein the flavor enrobes the carrier.

16. The carrier of claim 14 wherein the flavor is incorporated within the carrier.

17. A batter comprising the edible flavor carrier of claim 13.

18. A dough comprising the edible flavor carrier of claim 13.

19. The edible carrier of claim 13 and further comprising a color.

20. An edible baked product, comprising a baked batter matrix and a plurality of the carrier of claim 13.

21. An edible baked product, comprising a baked dough and a plurality of the carrier of claim 13.

* * * * *